United States Patent
Atakan et al.

(10) Patent No.: US 10,662,116 B2
(45) Date of Patent: May 26, 2020

(54) SYNTHETIC POZZOLANS

(71) Applicant: Solidia Technologies, Inc., Piscataway, NJ (US)

(72) Inventors: Vahit Atakan, West Windsor, NJ (US); Sean Quinn, Branchburg, NJ (US); Sadananda Sahu, Tallahassee, FL (US); Ahmet Cuneyt Tas, Piscataway, NJ (US)

(73) Assignee: Solidia Technologies, Ltd., Piscataway, NJ (US)

( * ) Notice: Subject to any disclaimer, the term of this patent is extended or adjusted under 35 U.S.C. 154(b) by 207 days.

(21) Appl. No.: 15/587,705

(22) Filed: May 5, 2017

(65) Prior Publication Data

US 2017/0320781 A1    Nov. 9, 2017

Related U.S. Application Data

(60) Provisional application No. 62/332,318, filed on May 5, 2016.

(51) Int. Cl.

| | |
|---|---|
| C04B 28/06 | (2006.01) |
| C04B 28/00 | (2006.01) |
| C04B 28/18 | (2006.01) |
| C01B 33/26 | (2006.01) |
| C04B 7/345 | (2006.01) |
| C04B 7/12 | (2006.01) |
| C04B 14/04 | (2006.01) |
| C04B 7/00 | (2006.01) |
| C04B 7/34 | (2006.01) |
| C04B 32/00 | (2006.01) |

(Continued)

(52) U.S. Cl.
CPC ............ *C04B 28/188* (2013.01); *C01B 33/26* (2013.01); *C04B 7/12* (2013.01); *C04B 7/345* (2013.01); *C04B 14/041* (2013.01); *C04B 14/043* (2013.01); *C04B 28/006* (2013.01); *C04B 28/18* (2013.01); *Y02P 40/165* (2015.11); *Y02P 40/18* (2015.11)

(58) Field of Classification Search
USPC ................................................ 106/638, 692
See application file for complete search history.

(56) References Cited

U.S. PATENT DOCUMENTS

| | | |
|---|---|---|
| 5,554,352 A | 9/1996 | Jaques et al. |
| 2003/0233962 A1 | 12/2003 | Dongell |

(Continued)

FOREIGN PATENT DOCUMENTS

WO    2016/022485 A1    2/2016

OTHER PUBLICATIONS

Chancey; Characterization of Crystaline and Amorphous Phases and Respective Reactivities in a Class F Fly Ash, 2008. (Year: 2008).*

(Continued)

*Primary Examiner* — James E McDonough
(74) *Attorney, Agent, or Firm* — Dentons US LLP

(57) ABSTRACT

Synthetic pozzolans are produced using local materials to provide a cementitious material that is uniform in chemistry and properties independent of the location where the materials are obtained. Two methods of production are described. One is a high temperature process in which materials are processed in a semi-molten or molten state. The second process is a low temperature aqueous process.

3 Claims, 1 Drawing Sheet

(51) Int. Cl.
   *C04B 7/36*    (2006.01)
   *C04B 9/11*    (2006.01)
   *C04B 11/28*   (2006.01)

(56) References Cited

U.S. PATENT DOCUMENTS

2012/0085265 A1    4/2012    Walenta et al.
2012/0152153 A1*   6/2012    Gong .................... C04B 28/006
                                                        106/705
2014/0283712 A1    9/2014    Bullerjahn et al.

OTHER PUBLICATIONS

Sahu, et al.: "CO2-Reducing Cement Based on Calcium Silicates", Presented at the 14th International Congress on the Chemistry of Cement by Solidia Technologies, XP055619905, Beijing, China, Oct. 1, 2015.

* cited by examiner

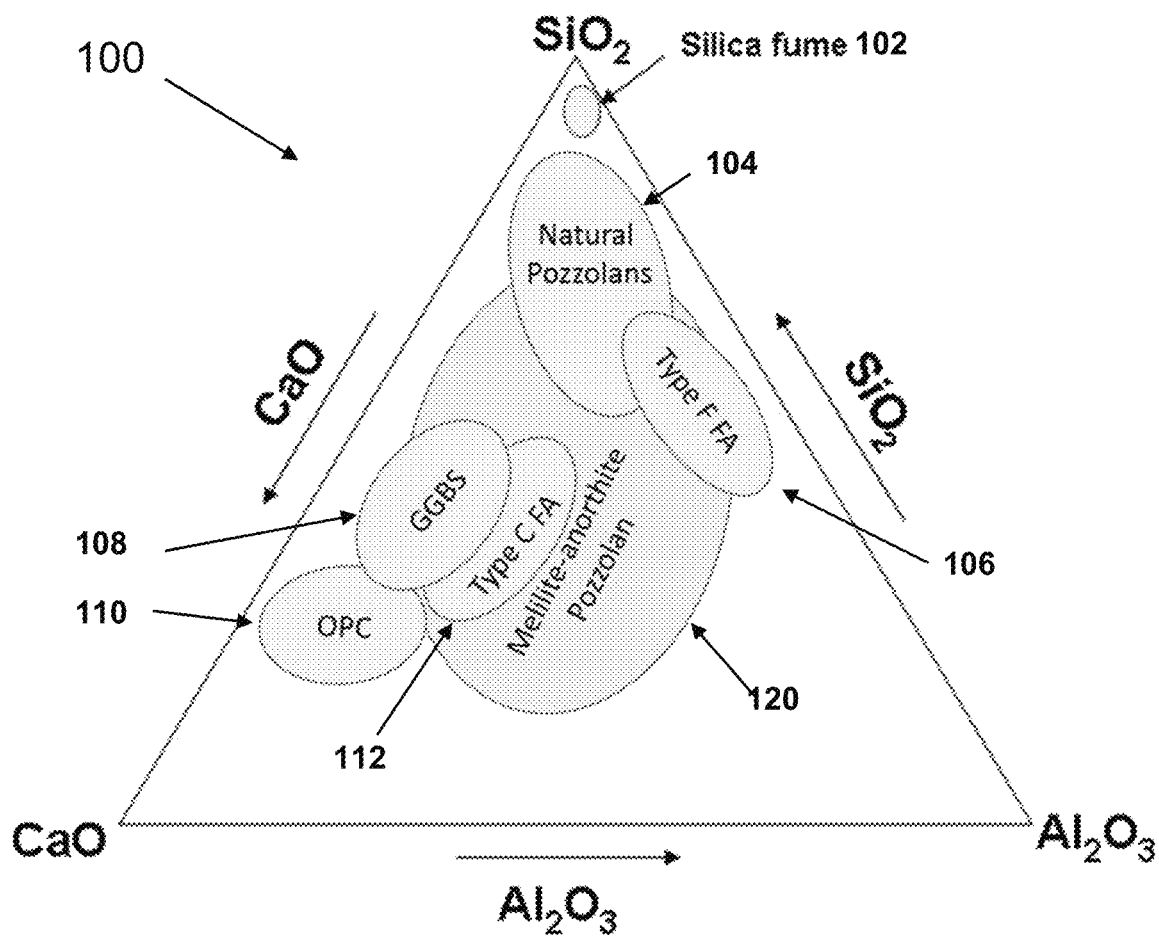

SYNTHETIC POZZOLANS

CROSS-REFERENCE TO RELATED APPLICATIONS

This application claims priority to and the benefit of U.S. provisional patent application Ser. No. 62/332,318, filed May 5, 2016, which application is incorporated herein by reference in its entirety.

FIELD OF THE INVENTION

The invention relates to concretes in general and particularly to pozzolanicz materials used in concrete compositions.

BACKGROUND OF THE INVENTION

Cements of various types have been employed for thousands of years in all manner of construction. Typical modern hydraulic cement, most commonly known as ordinary Portland cement (OPC), is one of the most consumed substance on the planet.

Though ordinary Portland cement based concretes have a lower $CO_2$ footprint than most other structural materials, the sheer volume of Portland cement concrete produced every year makes it a significant contributor to global anthropogenic carbon dioxide emissions. In order to reduce global $CO_2$ emissions it is necessary to adopt new approaches to create a new generation of hydraulic cements. Today, the most efficient cement kiln can produce cement clinker with an associated emission of 816 kg of $CO_2$ per ton of OPC clinker. Blending the ground cement clinker with supplementary cementitious materials (SCM) which have low or zero associated production $CO_2$ emissions reduces the total embodied $CO_2$ of the final product. Using a cement with the lowest possible clinker factor for a given application is the most common industry approach to reducing the $CO_2$ footprint of concrete installations.

The SCMs blended with OPC clinker to obtain a low clinker factor are mainly fly ash and slag. Given the drive to reduce the $CO_2$ footprint through a reduction in cement clinker factor, the demand for what were previously considered waste materials (fly ash and slag) has increased to the point where the costs of these materials can be comparable to OPC. Due to this demand for substances previously considered waste products as well as minimally processed waste oil shales or clay minerals can be economically produced and utilized as SCMs.

There is a need for sustainable SCMs that can be produced and replace OPC significantly in concrete.

SUMMARY OF THE INVENTION

According to one aspect, the invention describes methods of producing materials with a significant proportion of an activatable amorphous phase.

In one embodiment, the material is produced through the comminution and firing of materials in a high temperature, solid state process to produce clinker with some crystalline component and some activatable amorphous phase derived from the liquid phase generated during firing.

In another embodiment, the material is produced by the aqueous decomposition or dissolution of a natural, waste, or man-made silicate containing mineral with $CO_2$ to create an activatable amorphous phase and additional crystalline precipitates.

In yet another embodiment, the produced activatable amorphous phase containing material is combined with water and an activator to create a cementitious composite material.

In still another embodiment, the activator is selected from OPC (1-70 wt %), free lime (1-20 wt %), calcium hydroxide (1-20 wt %), and alkali hydroxides (NaOH, KOH 1 to 10 wt %), individually or in combination.

According to one aspect, the invention features a synthetic pozzolan comprising at least 10% by mass of an activatable amorphous phase comprised of one or more of siliceous, aluminosiliceous and aluminous material, the activatable amorphous phase configured to be activated by conducting a chemical reaction to form a cementitious compound.

In one embodiment, the synthetic pozzolan further comprises a crystalline phase.

In another embodiment, the crystalline phase comprises in its majority crystalline melilite.

In yet another embodiment, the crystalline phase comprises in its majority crystalline plagioclase feldspar.

In still another embodiment, the crystalline phase comprises in its majority crystalline alkali feldspar.

According to another aspect, the invention relates to a method of making a synthetic pozzolan, the synthetic pozzolan comprising at least 10% by mass of an activatable amorphous phase, the method comprising the step of performing a solid state reaction in a high temperature process to produce a clinker.

In one embodiment, the step of performing a solid state reaction in a high temperature process comprises the steps of: selecting one or more precursor raw materials; analyzing the chemical compositions of the one or more precursor raw materials; blending the one or more precursor raw materials to obtain a blended precursor composition with a bulk molar ratio of Ca to the sum of Al, Fe, Mg, Si of 0.5-1.0 and a sum of metal oxides of Al, Fe and Mg of at least 14% by weight; and heating the blended precursor composition to a temperature between 800° C. and 1400° C. for a time sufficient to react the blended precursor composition to produce a melilite based clinker.

In another embodiment, the step of performing a solid state reaction in a high temperature process comprises the steps of: selecting one or more precursor raw materials; analyzing the chemical compositions of the one or more precursor raw materials; blending the one or more precursor raw materials to obtain a blended precursor composition with a bulk chemistry of $AlSi_2O_8$ with the addition of a one or more of CaAl (anorthite end member), NaSi (albite end member), or KAl (orthoclase end member) with a molar ratio of the CaAl+NaSi+KAl components to $AlSi_2O_8$ of 0.8-1.2 to 1; and heating the blended precursor composition to a temperature between 800° C. and 1400° C. for a time sufficient to react the blended precursor composition to produce a plagioclase feldspar based clinker.

In yet another embodiment, the method of making a synthetic pozzolan further comprises the step of using of a pretreatment chemical to improve a reaction rate or a maximum extent of reaction of the solid state reaction over the reaction rate or the maximum extent of reaction that is observed in the absence of the pretreatment chemical.

In still another embodiment, the pretreatment chemical is an organic acid solution containing at least one of acetic acid, citric acid, tartaric acid, gluconic acid, and oxalic acid.

In a further embodiment, the method of making a synthetic pozzolan comprises the step of introducing the pretreatment chemical during grinding of the clinkers.

In yet a further embodiment, the method of making a synthetic pozzolan comprises the step of introducing the pretreatment chemical to a ground clinker.

According to another aspect, the invention relates to a method of making a synthetic pozzolan, the synthetic pozzolan comprising at least 10% by mass of an activatable amorphous phase, the method comprising the step of performing an aqueous reaction in a low temperature process.

In one embodiment, the step of performing an aqueous reaction in a low temperature process comprises using a precursor comprising a silicate mineral configured to decompose or incongruently dissolve to form an activatable amorphous phase and a precursor chemical configured to aid in the decomposition or dissolution of the precursor mineral.

In another embodiment, the method of making a synthetic pozzolan further comprises the step of percolating a $CO_2$ containing waste gas through a reactor.

In yet another embodiment, the precursor chemical is an acid.

In still another embodiment, the precursor chemical is derived from $CO_2$ gas.

In a further embodiment, the precursor chemical is synthesized from $CO_2$ gas.

In yet a further embodiment, the precursor mineral is selected from a naturally obtained mineral, a siliceous limestone, a clay, wollastonite, olivine, and feldspar.

In an additional embodiment, the precursor mineral is a manmade material selected from ordinary Portland cement, a calcium sulfoaluminate cement, a calcium aluminate cement, a carbonateable calcium silicate cement, and synthetic foundry sand.

In one more embodiment, the precursor mineral is a synthetically produced pozzolan.

In still a further embodiment, the precursor mineral is selected from a waste material, slag and fly ash.

In a further embodiment, the activatable amorphous phase comprises $SiO_2$, $Al_2O_3$ and $Al_2O_3$—$SiO_2$.

According to another aspect, the invention relates to a composite material produced by the blending of a synthetic pozzolan of Claim 1 with an activator and water.

In one embodiment, the activator is selected from hydraulic cement (1-70 wt %), free lime (1-20 wt %), calcium hydroxide (1-20 wt %), and alkali hydroxides (NaOH, KOH 1 to 10 wt %), individually or in combination.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1 is a ternary CaO—$SiO_2$—$Al_2O_3$ phase diagram showing both common pozzolan chemistries, the general chemistry of ordinary Portland cement clinker, and the region of interest for high temperature melilite-anorthite type clinker, according to principles of the invention.

DETAILED DESCRIPTION

This invention will reduce the $CO_2$ footprint of traditionally produced hydraulic cements. SCMs are typically composed of amorphous silicates and or amorphous aluminosilicates that can be activated in the presence of a base. An activatable amorphous phase is an amorphous phase that comprises amorphous silicate and or amorphous aluminosilicate phase that can be activated to have a cementitious property.

To achieve a high impact on the cement and concrete industry, these SCMs should be able to be produced globally, preferably within the existing cement infrastructure, with a reliable and sustainable supply chain.

In order to decrease the embodied $CO_2$ footprint of concrete products, efforts have been undertaken to reduce the amount of clinker while producing cement. This has been made possible across many applications through the use of pozzolans. Pozzolans encompass a range of natural materials and industrial by-products that possess the ability to replace a proportion of Portland cement in a concrete while still contributing to the strength of the final concrete member. Since these materials contribute to the strength of the material, they are able to replace a substantial amount of Portland cement, in some cases up to 80%.

Many pozzolanic materials, especially industrial by-products, have inherently low embodied $CO_2$ footprints. In some embodiments, their use in blended cements significantly reduces the embodied $CO_2$ footprint of the cement.

The term "pozzolan" broadly encompasses siliceous or alumino-siliceous and aluminous materials which do not possess any intrinsic cementitious properties, but may be chemically react (or be activated) with calcium hydroxide in the presence of water to form cementitious compounds. We also refer to pozzolan material as an activatable amorphous phase. Historically, naturally occurring materials containing a volcanic glass component were used in combination with slaked lime to create the mortars integral to ancient construction practices. In modern times, a large number of pozzolanic materials are used in conjunction with hydraulic cements. These include materials such as fly ash, ground granulated blast furnace slag (GGBFS), silica fume, burned organic residues (for example, rice husk ash), reactive metakaolin (calcined clays), calcined shales, volcanic ash, pumice and diatomaceous earth.

FIG. 1 is a ternary CaO—$SiO_2$—$Al_2O_3$ phase diagram 100 showing both common pozzolan chemistries, the general chemistry of ordinary Portland cement clinker, and the region of interest for high temperature melilite-anorthite type clinker, according to principles of the invention.

In FIG. 1 there are some prior art pozzolans illustrated, including silica fume 102, natural pozzolans 104, Type F FA (Fly Ash) 106, GBBS (also referred to as ground granulated blast furnace slag GGBFS) 108, OPC 110, and Type C FA (Fly Ash) 112.

In FIG. 1, the novel pozzolans of the present invention are denoted by that portion of the region 120 Melilite-anorthite Pozzolan that does not overlap any of the prior art pozzolans in composition.

The reaction of a pozzolan in a typical hydraulic cement system is simply the reaction between portlandite (Ca(OH)$_2$), supplied by the hydraulic cement component, and silicic acid ($H_4SiO_4$). This reaction creates a compound generally referred to as calcium silicate hydrate (C—S—H), generally written as $CaH_2SiO_4 \cdot 2H_2O$. The formation of C—S—H is shown in Equation 1. Although this can be written as a stoichiometric reaction, in practice the CSH phase can have a highly variable Ca/Si molar ratio and a highly variable crystalline water content.

As used herein, the subscripts (aq), (s), (l) are intended to denote aqueous, solid and liquid, respectively.

$$Ca(OH)_{2(aq)} + H_4SiO_{4(aq)} \rightarrow CaH_2SiO_4 \cdot 2H_2O_{(s)} \quad (1)$$

In many cases, aluminum hydroxide is also present in an aqueous medium (aluminate, $Al(OH)_4^-$) and can undergo a similar reaction, to form calcium aluminate hydrates such as $C_4AH_{13}$ ($Ca_4Al_2O_7 \cdot 13H_2O$) or $C_3AH_6$ ($Ca_3Al_2O_6 \cdot 6H_2O$, hydrogarnet). In the presence of silicic acid calcium aluminate silicate hydrates (C-A-S—H) such as $C_2ASH_8$ ($Ca_2Al_2SiO_7 \cdot 8H_2O$, strätlingite) or more complex C-A-S—H precipitates will form. The reactions which produce simple C-A-H and C-A-S—H species are shown in Equations 2-4. Like C—S—H species, the Ca, Si, Al and $H_2O$ content of C-A-S—H species can be highly variable.

$$4Ca(OH)_{2(aq)} + 2Al(OH)_{3(aq)} + 6H_2O_{(l)} \rightarrow Ca_4Al_2O_7 \cdot 13H_2O_{(s)} \quad (2)$$

$$3Ca(OH)_{2(aq)} + 2Al(OH)_{3(aq)} \rightarrow Ca_3Al_2O_6 \cdot 6H_2O_{(s)} \quad (3)$$

$$2Ca(OH)_{2(aq)} + 2Al(OH)_{3(aq)} + H_4SiO_{4(aq)} + H_2O_{(l)} \rightarrow Ca_2Al_2SiO_7 \cdot 8H_2O_{(s)} \quad (4)$$

Alkali species such as potassium or sodium are also react with aqueous aluminum hydroxide and silicic acid under some circumstances and form similar alkali aluminum silicate hydrate precipitates.

In the presence of other anionic species such as sulfate or carbonate other complex hydrates such as ettringite ($Ca_6Al_2(SO_4)_3(OH)_{12} \cdot 26H_2O$) or monocarbonate ($Ca_3Al_2O_6 \cdot CaCO_3 \cdot 11H_2O$) can precipitate. The formation of ettringite and monocarbonate are shown in Equations 5 and 6.

$$3Ca(OH)_{2(aq)} + 2Al(OH)_{3(aq)} + 3CaSO_{4(aq)} + 26H_2O_{(l)} \rightarrow Ca_6Al_2(SO_4)_3(OH)_{12} \cdot 26H_2O_{(s)} \quad (5)$$

$$4Ca(OH)_{2(aq)} + 2Al(OH)_{3(aq)} + H_2CO_{3(aq)} + 10H_2O_{(l)} \rightarrow Ca_3Al_2O_6 \cdot CaCO_3 \cdot 11H_2O_{(s)} \quad (6)$$

The various complex hydrate species described can be broadly described as cementitious compounds, and are known to contribute to the mechanical strength of cementitious systems.

In order to participate in the pozzolanic reaction, the pozzolan used in the system must have the ability to generate aqueous $H_4SiO_4$ and $Al(OH)_3$. Due to the inherent instability of amorphous $SiO_2$ and $Al_2O_3$ containing phases they are preferred over crystalline phases. In many cases, the solubility of the $SiO_2$ and $Al_2O_3$ can be enhanced by curing pozzolan containing concretes at high temperatures or through the incorporation of alkali hydroxide activators. This pozzolanic phase is referred to as an "activatable amorphous phase" in the context of this invention.

The composition of a particular pozzolan defines which species it may contribute to the formation of cementitious compounds. Highly siliceous pozzolans may contribute only $SiO_2$ related species to the reaction process. A diversely composed pozzolan like ground granulated blast furnace slag may contribute $SiO_2$, $Al_2O_3$ and CaO derived species to the cementitious compounds.

Natural pozzolans, namely volcanic pumice derived from deposits of volcanic ash, have been used since antiquity. These rocks, when ground, have a high degree of natural pozzolanic activity due to their amorphous character. However, they are restricted geographically and are only abundant for use as a SCM in certain areas of Europe and the Middle East. Since the cement industry is inherently a high volume, low margin industry the processing and transportation of natural pozzolans is only economically sustainable in certain circumstances.

The calcination of certain natural raw materials to create a pozzolanic material is another approach to supplying a large quantity of reactive SCM. Calcination of clay minerals to create metakaolin (amorphous $Al_2Si_2O_7$) for use as an SCM has been developed. In some cases the clay feedstock is calcined with limestone which provides portlandite ($Ca(OH)_2$) for the pozzolanic reaction when combined with water. Calcination of waste shales from oil or natural gas extraction is also used to create a more complex material which can contain various proportions of metakaolin, amorphous silica, and free lime.

Similarly to the use of natural pozzolans, the use of simple processed pozzolans is based on the local availability of suitable raw materials. Many approaches to calcined clay based pozzolans require a specific clay chemistry which is not geographically abundant. Calcination of shales, especially from hydrocarbon extraction waste, is restricted to the location where these operations are taking place and additionally require that the extracted rock be of a suitable chemistry for processing into an SCM. In contrast to a natural pozzolan, which may only require the processing steps of crushing and/or grinding, the calcined natural pozzolans require additional rotary kiln processing to create the amorphous aluminosilicate phase which reacts with portlandite. This extra processing necessitates appropriate processing infrastructure, additional transportation, and additional costs which limits the economic sustainability except under very favorable conditions.

Industrial by-products are the most typical modern SCMs. The three most common by-products utilized are fly ash, ground granulated blast furnace slag (GGBFS) and silica fume. The advantage of using such by-products is that the embodied carbon dioxide footprint can be taken as zero (0). The cost of these materials should be low. However, this no longer the case since the drive for decrease of clinker factor in the cement industry has driven demand for such materials to the point where they can cost as much or more than the hydraulic clinker component of a blended cement. Like natural pozzolans, by-products are also subject to geographic limitations. For example, countries with little steel production will not have access to GGBFS.

Both GGBFS and fly ash can be blended in high proportions in hydraulic cement systems, which makes them extremely attractive for the purpose of reducing clinker factor. However, since these materials are by-products for which the method of their manufacture is a side effect of another industrial product they suffer in variations in composition and quality. The composition and reactivity of these by-products varies depending on the specifics of the process and the raw materials from which they are derived. Because of this there is a high variability in quality both geographically and over time.

In order for reactive SCMs like pozzolans to be utilized more widely within the concrete industry the challenges of universal availability and uniformity of quality need to be addressed. An engineered pozzolan which is industrially produced using abundant and inexpensive raw materials and existing production infrastructure where possible is a preferred solution. In some embodiments, the solution should be able to be able to be synthesized using globally available raw materials and be able to be controlled for consistency. An engineered pozzolan also preferably exhibits a lower embodied $CO_2$ footprint than conventional hydraulic cement.

As described herein, a "synthetic pozzolan" is a man-made reactive SCM for use in combination with an activator to create a cementitious binder. A synthetic pozzolan contains some proportion of material that is able to react with an activator create cementitious precipitates.

A synthetic pozzolan commonly contributes Si and Al ions to cementitious precipitates. Depending on the composition, the synthetic pozzolan may contribute other species to the formation of cementitious precipitates such as Na, K, Fe, Mg or Ca.

In some embodiments, the composition of the synthetic pozzolan may be engineered in order to tailor the ratio of cementitious compound forming species contributed to a synthetic pozzolan-activator system.

The present disclosure describes routes to produce a continuous and reliable supply of an activatable amorphous phase containing material sometimes known as a "pozzolan" or a "pozzolanic material".

Two distinct routes to producing a pozzolan-containing substance are described.

High Temperature Based Approach

One route is a high temperature method that could be implemented into existing cement kilns with existing raw materials. Two high temperature, clinker forming, chemistries are described.

One chemistry is based on melilite minerals and the second one is based on plagioclase feldspars.

In some embodiments, the cementitious material produced from the high temperature processing is a combination or some intermediate of the melilite and plagioclase based systems.

In certain embodiments the precursor raw materials used for the high temperature processing can include natural raw materials such as limestone, silts, sandstones, clays, diatomaceous earths, marls, bauxites, iron ore, or other suitable natural resource.

In certain embodiments the precursor raw materials used for the high temperature processing can include waste or process by-products such as fly ash, slag, silica fume, foundry sand, ore extraction tailings, quarry cuttings, glass cullet, crushed concrete waste or suitable waste or process by-product.

In certain embodiments the precursor raw materials used for the high temperature process can be some combination of natural sources and waste and process by-product sources.

The second approach describes subjecting silicate containing minerals which can be sourced from several different areas to a low temperature aqueous process wherein they decompose or dissolve to yield an activatable amorphous phase.

In certain embodiments the aqueous process is driven through the use of chemical species, preferably carbonic acid or bicarbonate ion or oxalic acid, derived from $CO_2$ gas.

In some embodiments the silicate mineral precursor for the aqueous process can be a naturally sourced silicate mineral or minerals such as wollastonite, olivine, clay minerals, limestones, or feldspars.

In some embodiments the silicate mineral precursor for the aqueous process can be a waste material such as fly ash, slag, foundry sand, or ore extraction tailings.

In some embodiments the silicate mineral precursor for the aqueous process can be a man-made material such as ordinary Portland cement, carbonatable calcium silicate cement, calcium sulfoaluminate cement, belite cement, calcium aluminate cement or synthetic casting sands.

Melilite Clinker

A melilite mineral is a sorosilicate which is comprised of a crystalline solid solution between gehlenite ($Ca_2Al_2SiO_7$) and akermanite ($Ca_2MgSi_2O_7$). Melilites also may contain significant proportions of iron or sodium, in certain conditions reaching iron-akermanite ($Ca_2Fe^{2+}Si_2O_7$), iron-gehlenite ($Ca_2Fe^{3+}AlSiO_7$), or soda melilite ($NaCaAlSi_2O_7$) compositions. Under certain conditions melilites may additionally incorporate potassium ions substitutionally. Melilites can be described using the general formula $(Ca,Na,K)_2[(Mg,Fe^{2+},Fe^{3+},Al,Si)_3O_7]$.

A melilite mineral composition is comprised of a blend of discrete crystalline melilite phases, or as a melilite solid solution which may be described by any of aforementioned mineral species.

Melilite mineral compositions also contain amorphous (non-crystalline) calcium aluminosilicate phase in additional to the crystalline phases described above. This amorphous phase may also include many impurity species introduced from raw materials or from processing.

A melilite mineral composition is designed by selecting one or more precursor raw materials and blending them to obtain a blended precursor with a bulk molar ratio of Ca to the sum of Al, Fe, Mg, Si of 0.5-1.0 and a sum of metal oxides of Al, Fe and Mg so that these oxides will compose 14% of the mass of the final melilite mineral composition; and heating the blended precursor composition to a temperature between 800° C. and 1400° C.

Alkali species, such as Na or K may substitute for Ca in the crystalline melilite phase.

Alkali species, such Na or K, or halogen species, such as F or Cl, may be introduced to create more liquid during firing and thus more amorphous phase in the final melilite mineral composition.

When designing a melilite mineral composition, the target composition can be ascertained through chemical analysis of available precursor raw materials. The chemical analysis can be performed in any convenient matter, such as wet chemistry, x-ray diffraction analysis, and EDAX. In some embodiments, it is expected that there will be some trace impurities not expressed in the target composition such as iron, sodium, potassium, and other ubiquitous elements.

This clinker chemistry is able to be produced using existing cement manufacturing infrastructure and raw materials with minimal process modification.

This target chemistry is expected to yield a reduction of ~40% in $CO_2$ emissions compared to ordinary Portland cement (OPC) produced in the most efficient kiln today.

It is expected that in some embodiments, the major phases that are produced will be crystalline melilite and amorphous calcium aluminum silicate. In some embodiments, the amorphous calcium aluminum silicate comprises the activatable amorphous phase. It is expected that in some embodiments, there will be minor phases (probably less than 7%) including one or more of residual silica, free lime, C2S (belite $Ca_2SiO_4$), CS (Wollastonite $CaSiO_3$), and C3S2 (rankinite $Ca_3Si_2O_7$), krotite ($CaAl_2O_4$), grossite ($CaAl_4O_7$), hibonite ($CaAl_2O_{19}$), corundum ($Al_2O_3$), or anorthite ($CaAl_2Si_2O_8$).

In some embodiment, the oxide composition of the activatable amorphous phase depends on the oxide composition of the blended precursor and the thermal history of the melilite mineral composition. By way of example, in the case of a 100% amorphous melilite mineral composition, the oxide composition of the activatable amorphous phase will be the same as the oxide composition of the blended precursor. When crystalline phases are present, the oxide composition of the activatable amorphous phase will be the oxide composition of the blended precursor minus the net oxide composition of the crystalline phases.

Feldspar Clinker

Another high temperature activatable mineral composition is based on plagioclase and orthoclase feldspars. Anorthite ($CaAl_2Si_2O_8$) is a mineral system near gehlenite in the $CaO$—$Al_2O_3$—$SiO_2$ ternary equilibrium diagram. Anorthite in conjunction with sodium and potassium gives rise to a larger series of minerals known as the plagioclase and alkali feldspars. For brevity, this family of minerals will be generally referred to as 'feldspars'. A feldspar based activatable mineral can have an even lower embodied $CO_2$ footprint than a melilite based activatable mineral due to requiring less Ca and thus less $CaCO_3$ to synthesize.

Feldspar minerals are geologically common minerals, the majority of which can be classified chemically as members of the ternary system albite ($NaAlSi_3O_8$, Ab)-orthoclase ($KAlSi_3O_8$, Or)-anorthite ($CaAl_2Si_2O_8$, An). Compositions between albite and orthoclase are commonly known as alkali feldspars and those between albite and anorthite are commonly known as plagioclase feldspars. Minerals of a solid solution between anorthite and albite are commonly defined by the anorthite (An) content of the mineral. These include anorthite (>90% An), bytownite (70%-90% An), labradorite (50%-70% An), andesine (30%-50% An), oligoclase (10%-30% An), and albite (0%-10% An). Minerals of a solid solution series between albite and orthoclase are similarly defined by their relive orthoclase (Or) content. These include albite (0%-10% Or), anorthoclase (10%-36% Or). At higher orthoclase contents, various combinations of microcline ($KAlSi_3O_8$), sanidine ($KAlSi_3O_8$) may be observed in combination with albite or anorthoclase inclusions.

A feldspar mineral composition is comprised of a blend of discrete crystalline plagioclase or alkali feldspar phases, or as a plagioclase solid solution series, or as an alkali feldspar solid solution series, or as a combination of any of aforementioned mineral species or solid solutions.

Feldspar mineral compositions also contain amorphous (non-crystalline) calcium aluminosilicate phase in additional to the crystalline phases described above. This amorphous phase may also include many impurity species introduced from raw materials or from processing.

A feldspar mineral composition is designed by selecting one or more precursor raw materials and blending them to obtain a blended precursor with a bulk chemistry described by a base composition of $AlSi_2O_8$ with the addition of a combination of CaAl (anorthite end member), NaSi (albite end member), or KAl (orthoclase end member) with a molar ratio of the CaAl+NaSi+KAl components over the $AlSi_2O_8$ of 0.8-1.2.

In some embodiments, the ratios of KAl, CaAl, NaSi, can be varied to increase the level of liquid during firing and thus amorphous phase in the final feldspar mineral composition.

In some embodiments, halogen species such as Cl or F can be introduced to increase the level of liquid during firing and thus amorphous phase in the final feldspar mineral composition.

When designing a feldspar mineral composition, the target composition can be ascertained through chemical analysis of available precursor raw materials. The chemical analysis can be performed in any convenient matter, such as wet chemistry, x-ray diffraction analysis, and EDAX. In some embodiments, it is expected that there will be some impurities not expressed in the target composition such as iron, magnesium and other ubiquitous elements.

This clinker chemistry is able to be produced using existing cement manufacturing infrastructure and raw materials with minimal process modification.

This target chemistry is expected to yield a reduction of ~60% in $CO_2$ emissions compared to ordinary Portland cement (OPC) produced in the most efficient kiln today.

It is expected that in some embodiments, the major phases that are produced will be crystalline anorthite or feldspar and amorphous calcium aluminum silicate. In some embodiments, the amorphous calcium aluminum silicate comprises the activatable amorphous phase. It is expected that in some embodiments, there will be minor phases (probably less than 7%) including one or more of residual silica, free lime, C2S (belite $Ca_2SiO_4$), CS (wollastonite $CaSiO_3$), and C3S2 (rankinite $Ca_3Si_2O_7$), krotite ($CaAl_2O_4$), grossite ($CaAl_4O_7$), hibonite ($CaAl_{12}O_{19}$), corundum ($Al_2O_3$), melilite ($(Ca,Na,K)_2(Al, Fe^{2+},Fe^{3+},Mg,Si)_2SiO_7$), nepheline ($Na_3KAl_4Si_4O_{16}$), leucite ($KAlSi_2O_6$), diopside ($MgCaSi_2O_6$), hedenbergite ($FeCaSi_2O_6$), augite ($(Ca,Na)(Mg,Fe,Al,Ti)(Si,Al)_2O_6$), or olivine group minerals ($(Mg,Fe)_2SiO_4$).

In some embodiments, the oxide composition of the activatable amorphous phase depends on the oxide composition of the blended precursor and the thermal history of the feldspar mineral composition. By way of example, in the case of a 100% amorphous feldspar mineral composition, the oxide composition of the activatable amorphous phase will be the same as the oxide composition of the blended precursor. When crystalline phases are present, the oxide composition of the activatable amorphous phase will be the oxide composition of the blended precursor minus the net oxide composition of the crystalline phases.

Cement Compositions

It is intended that the material formed will be a mixture of crystalline phases and an amorphous phase. The more amorphous phase present, the better. However for rotary kiln operation it is expected that the amorphous phase may comprise 30%, 40% or 50% of the product. For other types of kilns in which the entire charge is melted, the amorphous phase may comprise even higher percentages, for example, 60%, 70% or 80% of the product.

In either the melilite or feldspar embodiments, the mixture of crystalline phases and an amorphous phase is then expected to be blended with activators as described below.

The process of producing the cement includes one of the reactions described to produce a melilite mineral composition or a feldspar mineral composition and their associated amorphous phases.

The feldspar-melilite synthetic pozzolans as disclosed generally occupy the area of the $CaO$—$Al_2O_3$—$SiO_2$ phase diagram indicated in FIG. 1. Depending on the design of the feldspar-melilite synthetic pozzolan, the composition may fall within a region otherwise associated with other natural or by-product pozzolans. However, in such a situation it is intended that the synthetic pozzolan be willfully engineered to obtain a desired level of pozzolanic reactivity and industrial reproducibility, in contrast to a by-product material which is merely collected and minimally processed for use as a pozzolanic SCM.

The indicated feldspar-melilite synthetic pozzolan region on the $CaO$—$Al_2O_3$—$SiO_2$ phase diagram does not account for other species expected to be incorporated into the synthetic pozzolan materials either by design or by consequence of raw material selection. Species such as Na, K, Fe, Mg, Ti, Mn, and others present may further differentiate a synthetic pozzolan from an existing natural or by-product composition.

Additionally, there exists distinct spaces in the CaO—Al$_2$O$_3$—SiO$_2$ phase diagram which are not commonly associated with any utilized natural or by-product. One distinct range of compositions lies between silicious natural pozzolans and ground-granulated blast furnace slag. Another such distinct range lies in the center of the phase diagram in between Type C and Type F fly ash.

One then mills the material to provide particle sizes of the new synthetic pozzolan that are similar to that of OPC or finer.

One then blends the new synthetic pozzolan with one of the described activators. In some embodiments, the blending can be done by co-grinding. In certain other embodiment, the activator can remain separate and is introduced during the production of a composite material from the synthetic pozzolan.

Aqueous Synthesis

An alternative approach to synthesizing an activatable amorphous phase for use as an SCM is accomplished by exploiting the dissolution mechanism of many common silicate minerals. Many minerals, specifically calcium silicates, are capable of undergoing a process known as incongruent dissolution, in which the metal cation is leached from the original crystalline matrix. The removal of the metal cation creates instability in the crystalline phase, but the SiO$_2$ does not dissolve and is instead left behind as an amorphous solid phase. This nanoporous, amorphous SiO$_2$ reaction product is an ideal candidate for use as a pozzolanic SCM.

In some systems, the silicate mineral may dissolve fully and lead to the precipitation of an amorphous SiO$_2$ and some other precipitate.

Driving the dissolution is the displacement of metal cations from their host mineral by protonation, or reaction with H$^+$ (aq) ions. Thus, it is greatly enhanced at acidic pH levels.

Many routes to creating a pozzolan through such a dissolution process are possible. One simple route is through the carbonation of calcium silicate minerals.

Calcium silicate or calcium aluminate phases that are found in natural minerals, ordinary Portland cement, belite cement, calcium sulfoaluminate cement, calcium aluminate cement, and carbonatable calcium silicate cements, such as Solidia Cement, can be reacted with CO$_2$ (g) to create a crystalline calcium carbonate and an amorphous silicate and/or aluminate reaction product. In the case of carbonation directly from CO$_{2(g)}$, the CO$_2$ molecule is dissolved and disassociated as shown in Equations 7-9. The simplified reaction of the CO$_2$ with the calcium silicate phases are shown in Equations 10-13. It is understood that the SiO$_{2(s)}$ reaction product is present as an amorphous phase. Similarly, carbonation of calcium aluminates can produce amorphous Al$_2$O$_{3(s)}$.

  (7)

  (8)

  (9)

  (10)

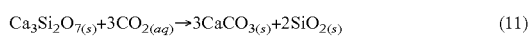  (11)

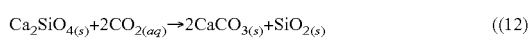  ((12)

  (13)

The synthesis of a pozzolan from calcium silicate mineral sources directly sequesters CO$_2$ gas as a solid within the product. This immediately offsets some of the CO$_2$ footprint generated from the manufacture of each mineral. The powder increases in mass from the precipitation of calcium carbonate during the carbonation process. This effectively increases that mass of the product created (e.g.: 1 ton of ground Portland cement may become 1.4 tons of synthetic pozzolan after a carbonation reaction process). The extend of carbonation of the metal silicate compound can be adjusted in a way to decrease the carbon footprint of the concrete formed. For example, partial carbonation of OPC, which is mainly a mixture of calcium silicate compounds can lead to CO$_2$ savings without comprising the desired performance of the concrete. OPC can be carbonated to different degrees such as 0.2 wt %, 0.5 wt %, 1 wt, 5 wt %, 10 wt % or higher to achieve different performances with various CO$_2$ savings. This carbonation process can be done in various ways such as during clinker grinding by blowing humid CO$_2$ gas through the mill.

In addition to the amorphous SiO$_2$ phase which can function as an activatable amorphous material, a significant amount of CaCO$_3$ (calcite, aragonite or vaterite) is generated from the carbonation. Fine CaCO$_3$ additions, especially from limestone, have been shown to have a positive impact on the properties of Portland cement concretes. This makes carbonated calcium silicate mineral based pozzolans a product which may benefit dually from the presence of an activatable amorphous phase and from the presence of fine CaCO$_3$ precipitates.

The synthesis of such a pozzolan from a calcium silicate mineral, especially from a rotary kiln produced Portland cement or carbonatable calcium silicate cement, could be accomplished directly at the place of manufacture. A system wherein the ground cement is carbonated directly with the CO$_2$ emitted during its production can be envisioned.

Another route to create a pozzolan is through the use of a stronger acid compared to carbonic acid, such as carboxylic acids, more specifically, H$_2$C$_2$O$_{4\ (aq)}$, oxalic acid. Using an oxalate with a calcium silicate has the added advantage of sequestering the equivalent of 2 molecules of CO$_2$ for every cation leached from the precursor silicate mineral.

The disassociation reaction of H$_2$C$_2$O$_{4\ (aq)}$ is shown in Equations 14 and 15.

  (14)

  (15)

The following reactions of calcium silicate type minerals with oxalic acid as they are believed to take place are disclosed in Equations 16-19. It is understood that the SiO$_{2(s)}$ reaction product is present as an amorphous phase.

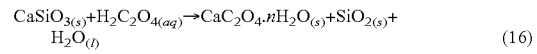  (16)

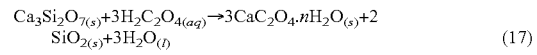  (17)

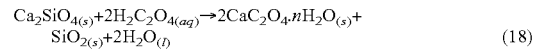  (18)

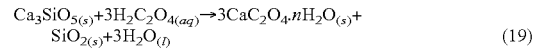  (19)

Some of the carboxylic acids, such as oxalic acid is able to react with mineral species that are inert or react very slowly with CO$_3^{2-}$$_{(aq)}$, or HCO$_3^-$$_{(aq)}$ species. This allows oxalate to facilitate the dissolution of a broader range of silicate and aluminosilicate minerals than may be addressed by carbonic acid alone. An example of a silicate mineral that can be readily oxalated but has a slow reaction with carbonic acid is olivine ($(Mg,Fe)_2SiO_4$).

The following reactions of olivine type minerals with oxalic acid as they are believed to take place is disclosed in Equation 20. It is understood that the $SiO_{2(s)}$ reaction product is present as an amorphous phase.

$$(Mg_x,Fe_y)_2SiO_{4(s)} + 2H_2C_2O_{4(aq)} \rightarrow XMgC_2O_4 \cdot nH_2O_{(s)} + YFeC_2O_4 \cdot nH_2O_{(s)} + SiO_{2(s)} + 2H_2O_{(l)} \quad (20)$$

Examples of aluminosilicate based minerals that are able to be reacted with oxalic acid include feldspars (anorthite, albite, orthoclase) and melilites (akermanite, gehlenite). In the oxalation reaction of these aluminosilicate minerals, it is believed that the $Al_2O_{3(s)}$ and $SiO_{2(s)}$ reaction products are present as an amorphous phase with both Si and Al based components.

The following reactions of feldspar and melilite type minerals with oxalic acid as they are believed to take place are disclosed in Equations 21-25.

$$CaAl_2Si_2O_{8(s)} + H_2C_2O_{4(aq)} \rightarrow CaC_2O_4 \cdot nH_2O_{(s)} + Al_2O_{3(s)} + 2SiO_{2(s)} \quad (21)$$

$$2NaAlSi_3O_{8(s)} + H_2C_2O_{4(aq)} \rightarrow Na_2C_2O_4 \cdot nH_2O_{(s)} + Al_2O_{3(s)} + 6SiO_{2(s)} + H_2O_{(s)} \quad (22)$$

$$2KAlSi_3O_{8(s)} + H_2C_2O_{4(aq)} \rightarrow K_2C_2O_4 \cdot nH_2O_{(s)} + Al_2O_{3(s)} + 6SiO_{2(s)} + H_2O_{(l)} \quad (23)$$

$$Ca_2Al_2SiO_{7(s)} + 2H_2C_2O_{4(aq)} \rightarrow 2CaC_2O_4 \cdot nH_2(s) + Al_2O_{3(s)} + SiO_{2(s)} + 2H_2O_{(l)} \quad (24)$$

$$Ca_2MgSi_2O_{7(s)} + 2H_2C_2O_{4(aq)} \rightarrow 2CaC_2O_4 \cdot nH_2O_{(s)} + MgC_2O_4 \cdot nH_2O_{(s)} + 2SiO_{2(s)} + 2H_2O_{(l)} \quad (25)$$

An interesting implication of the oxalation reaction, or the reaction with acids stronger than carbonic acids, such as carboxylic acids, of melilite or feldspar minerals to produce an amorphous silicate is the use of this process on existing SCMs. Fly ash and slag commonly used as pozzolans contain significant proportions of melilite, feldspar or other aluminosilicate phases. Processing of these materials with oxalic acid could make them more reactive by reacting with otherwise inert phases. This reaction could generate amorphous $SiO_2$ or $Al_2O_3$ which could contribute to pozzolanic reactions. The net effect of this pretreatment would be an increase of the pozzolanic activity of the treated product. The mass of these materials would also be extended proportional to the amount of oxalate reacted, increasing the amount of useable product.

The introduction of pretreatment chemicals during the grinding, blending, or as a distinct powder treatment can be used to convert otherwise inert crystalline aluminosilicate or calcium silicates into $SiO_2$ or $Al_2O_3$ phases which could contribute to pozzolanic reactions. These pretreatment chemicals include but not limited to sulfates, oxalates and organics.

The synthesis of a pozzolan from mineral sources indirectly sequesters $CO_2$ gas (since oxalate, $C_2O_4$, is synthesized from 2 $CO_2$ molecules) as a solid within the product. This immediately offsets some of the $CO_2$ footprint generated from the manufacture of each mineral. The powder increases in mass from the precipitation of oxalates during the carbonation process. This effectively increases the mass of the product created (e.g.: 1 ton of ground Portland cement may become 1.9 tons of synthetic pozzolan after an oxalate reaction process).

The fine oxalate particles precipitated during the reaction process may be beneficial to the casting or end properties of concrete bodies by serving as a fine filler.

The calcium silicate phases used as precursors can be sourced from commonly available cements such as ordinary Portland cement, carbonatable calcium silicate cements, calcium sulfoaluminate cements, calcium aluminate cements, or natural minerals. Since these materials, especially ordinary Portland cement, are able to be produced globally with reasonable uniformity they make an ideal source material for the production of synthetic pozzolan by a carbonation or oxalation based method.

The olivine phases used as precursors can be sourced from commonly available olivine based metal casting sands or from natural deposits.

The feldspar phases used as precursors can be sourced from plagioclase feldspar or anorthite based clinkers, slags, fly ash or from natural deposits.

The melilite phases used as precursors can be sourced from melilite based clinkers, slags, fly ash or from natural deposits.

Activators

The activators can be one of the following materials: OPC (1-90 wt %), free lime (1-20 wt %), calcium hydroxide (1-20 wt %), and alkali hydroxides (NaOH, KOH 1 to 10 wt %), individually or in combination. In general the activator may be an activator selected from the group of materials comprising inorganic and organic bases.

One then causes the activator to react with the amorphous phases in synthetic pozzolan.

The activators are expected to react with the amorphous phase resulting in the generation of cementitious compounds.

Concrete

Any of the synthetic pozzolans described in this disclosure may be integrated into a hydraulic cement based concrete mixture. The pozzolans are added as a replacement of the hydraulic cement at a level of 1%-99% replacement.

The binder system created by the combination of a hydraulic cement and a synthetic pozzolan becomes the binder component of a concrete body.

The hydraulic cement employed may be any one hydraulic cements such as ordinary Portland cement, calcium sulfoaluminate cement, belitic cement, or other calcium based hydraulic material.

The level of replacement of the hydraulic cement component of the binder system may be at suitable level, for example at 10% or more by mass of the total solid mass of the binder system (e.g., at about 10% or more, at about 20% or more, at about 30% or more, at about 40% or more, at about 50% or more, at about 60% or more, at about 70% or more, at about 80% or more, at about 90% or more, by mass of the total solids).

An activator is present in the concrete mixture. Preferably, the activator is $Ca(OH)_2$ generated during the natural hydration process of the hydraulic cement component. Additional activators may be added to enhance the performance of the synthetic pozzolan. The binder system used in a concrete can be created by the co-grinding of hydraulic cement clinker and a powdered or consolidated form of a synthetic pozzolan in a ratio determined at the site of the cement manufacture.

The binder system use in a concrete can alternatively be created by the intermixing of a powdered hydraulic cement and a powdered synthetic pozzolan at the site of concrete production.

The binder can be combined with coarse and fine aggregates and water to produce a concrete appropriate for cast in place applications such as foundations, road beds, sidewalks, architectural slabs, and other cast in place applications.

The binder can be combined with coarse and fine aggregates and water to produce a concrete appropriate for pre-cast applications such as pavers, CMUs, wet cast tiles, segmented retaining walls, hollow core slabs, and other pre-cast applications.

The binder can be combined with fine aggregates and water to produce a mortar appropriate for masonry applications.

The concretes produced using the synthetic pozzolan containing binder can be produced with any combination of the activators described.

The concretes produced using the synthetic pozzolan containing binder can be produced with chemical admixtures common to the concrete industry such as, plasticizing, water reducing, set retarding, accelerating, air entraining, corrosion inhibiting, waterproofing, and efflorescence reducing admixtures.

The effectiveness of a binder system as described can be determined by calculation of the "activity index" of the synthetic pozzolan and activator combination. This is accomplished by measuring the mechanical properties (typically compressive strength) of a series of standard samples (typically mortars) produced by various combinations of synthetic pozzolans, hydraulic cement activators, and any additional activators. The mechanical property measurement is then correlated with the synthetic pozzolan content of the mixture to determine an activity coefficient.

An activity coefficient of 1 indicates a parity of the synthetic pozzolan and the hydraulic cement being replaced. An activity coefficient greater than one indicates an improved performance of the synthetic pozzolan over the hydraulic cement being replaced. An activity coefficient of less than one indicates that the synthetic pozzolan contributes to the performance of the binder system, but at a lower level and the hydraulic cement being replaced. An activity coefficient of 0 indicates that the synthetic pozzolan does not contribute to the performance of the binder system and is essentially an inert filler.

The water used to form a concrete body fulfills two roles. First, the water drives and participates the various hydraulic reactions that lead to the formation of cementitious compounds and generate strength. Secondly, the water wets the particles in the mixtures, lubricates the system and allows the mixture to behave plastically and be formed into desired shapes. Water beyond what is required to drive the hydraulic reactions, sometimes referred to as free water, determines the porosity of the body being formed. A higher water content leads to a higher porosity, and a lower water content leads to a lower porosity.

Porosity in brittle materials is detrimental to mechanical performance. In order to create a concrete body with high mechanical performance, it is necessary to minimize the amount of porosity present in its final state. To this end, minimizing the water necessary to form a concrete body is an important aspect of creating a high performance material.

When synthetic pozzolans are used to create a binder system for a concrete, it is important to account for the change in workability that can be induced by changing the distribution of particle populations of the system.

A synthetic pozzolan with a well graded or engineered particle size distribution can lead to increased flow properties of the particle packing of the concrete system. This indirectly allows the water content of the mixture to be reduced and can lead to an improvement in the ultimate mechanical properties of the body.

A synthetic pozzolan with a poorly graded particle size distribution, or a one including particles of a high specific area, can lead to decreased flow properties of the concrete system. In such a non-optimized system, a higher water content is needed to maintain the flowability and workability of the mixture. This can be detrimental to the ultimate mechanical properties of the body.

A well designed particle size distribution can also lead to increased performance by optimizing the packing of the binder system during final consolidation. This causes the particle system to approach closer to a mathematically optimal packing scheme, increasing the density and final mechanical performance of the system.

The workability of a binder system is commonly estimated by measuring the flowability of a mortar mixture. In such a measurement the binder system, water, and standard graded sand are combined. The wet mortar mixture is then subjected to a reproducible disturbance (on a device such as a flow table, or tap table) and the spread of the mixture is quantified.

The details of manufacturing a synthetic pozzolan can be controlled to minimize the water demand of the end materials, and lead to an improvement in workability or strength of a concrete body purely from the effect of optimized particle size distribution and specific area.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A synthetic pozzolan comprising:
    at least 10% by mass of an activatable amorphous phase comprised of one or more of siliceous, aluminosiliceous and aluminous material, said activatable amorphous phase configured to be activated by conducting a chemical reaction to form a cementitious compound, and
    a crystalline phase, wherein the crystalline phase comprises, in its majority, synthesized crystalline melilite or synthesized crystalline plagioclase feldspar.

2. A composite material produced by blending the synthetic pozzolan of claim 1 with an activator and water.

3. The composite material of claim 2 wherein the activator is selected from hydraulic cement (1-70 wt %), free lime (1-20 wt %), calcium hydroxide (1-20 wt %), and alkali hydroxides (NaOH, KOH 1 to 10 wt %), individually or in combination.

* * * * *